United States Patent Office 3,172,680
Patented Mar. 9, 1965

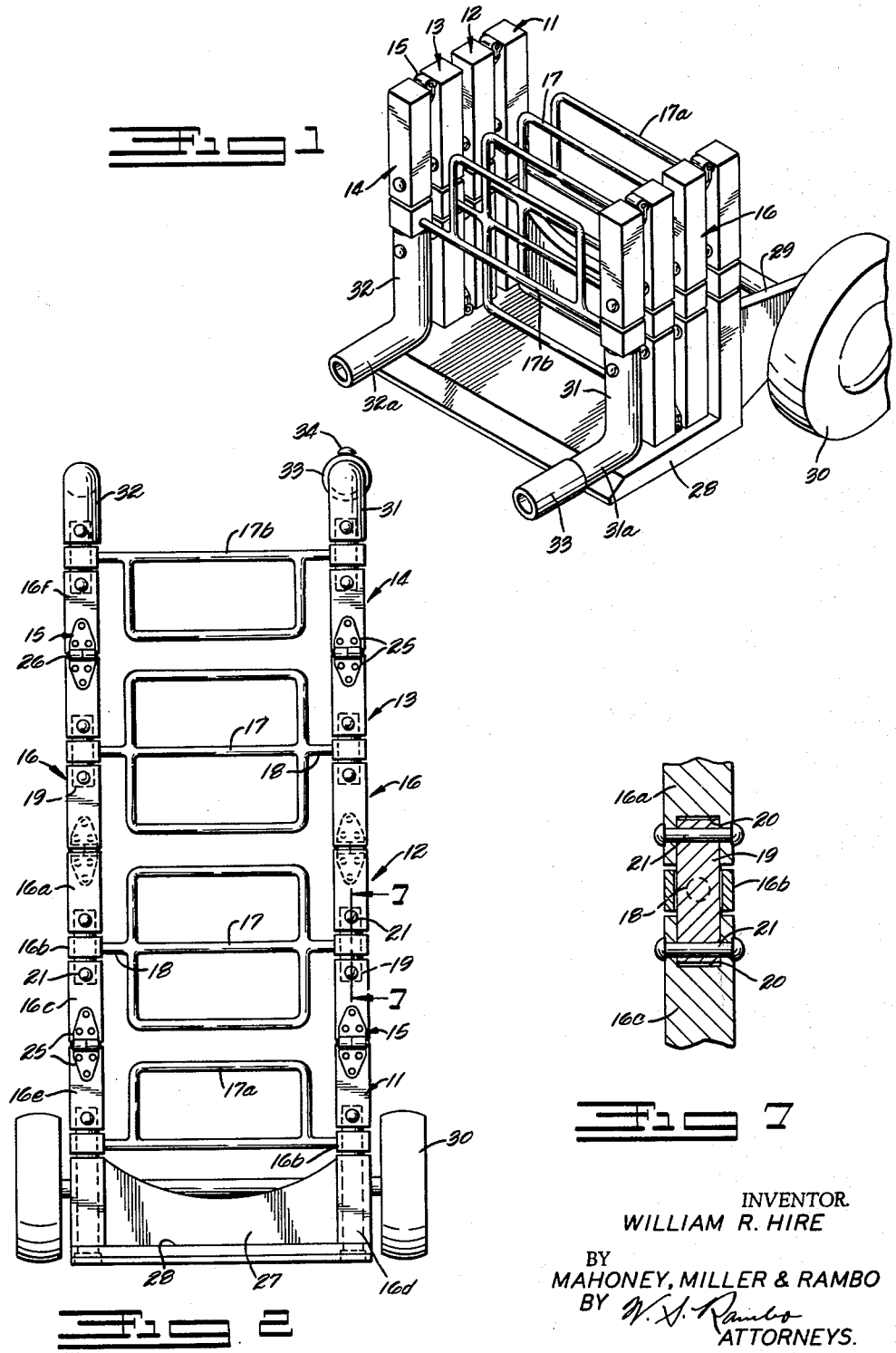

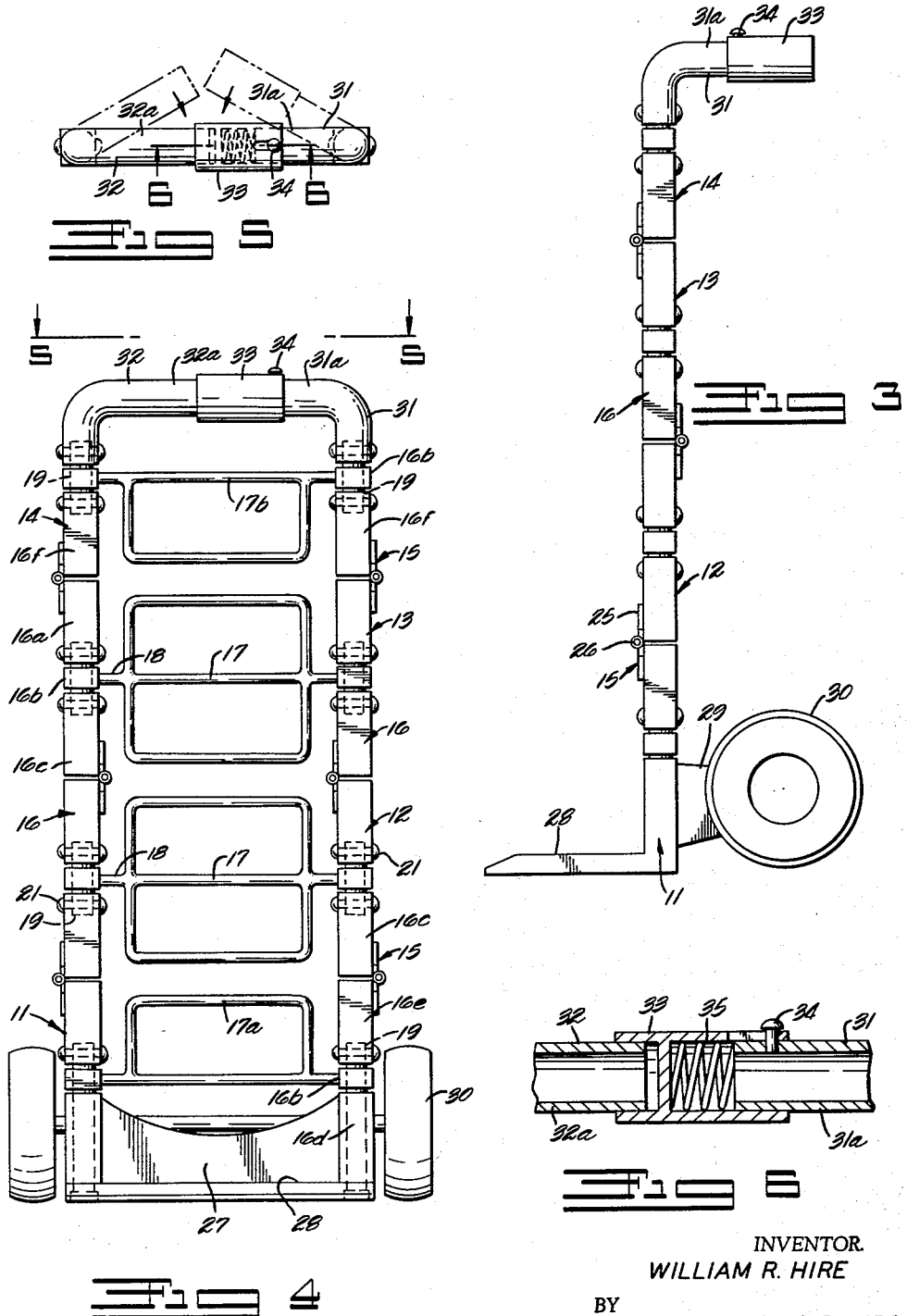

3,172,680
FOLDABLE FRAME VEHICLE
William R. Hire, Newark, Ohio, assignor, by direct and mesne assignments, to Research Manufacturing, Inc., Newark, Ohio, a corporation of Ohio
Filed Mar. 13, 1963, Ser. No. 264,798
4 Claims. (Cl. 280—36)

This invention relates to a Foldable Frame Vehicle. It has to do, more particularly, with a vehicle which has a frame composed of a plurality of hingedly connected sections so arranged as to be folded or collapsed into a compact structure, or extended into straight, longitudinally-adjoining order for use.

The primary object of this invention is to provide a vehicle or the like with a frame which is structurally simple yet mechanically efficient and which is so designed that it may be folded or collapsed easily into a compact arrangement for storage or may be extended and rigidly locked into a straight, elongated frame, with minimum effort and without the aid of detachable fastening devices, braces, etc. and without the aid of tools for applying or assembling such devices.

Another object of this invention is to provide a foldable vehicle frame which is economical in construction but sufficiently rugged to withstand normal usages, as a load-supporting frame.

This invention is disclosed hereinafter as being embodied in a truck of the two-wheeled hand type. However, it is to be understood that this is for illustrative purposes only and that it may be embodied in other forms of vehicles or the like.

According to the present invention, the vehicle frame is composed of a plurality of similarly formed, hingedly-connected sections with successive sections being preferably hinged to one another on opposite faces thereof, so as to permit the sections to be folded one upon another successively in accordion style with the frame sections in substantially parallel relationship to each other. Each of the hingedly-connected, frame-forming sections comprises a pair of opposed side rails and one or more load-supporting or tie members which extend transversely between the side rails and are joined therewith in a manner to permit relative rotation only of the side rails about their longitudinal axes. The hinge means for connecting adjacent side rails are so arranged that the lineal pintles or hinge axes are disposed transversely of and in perpendicular relationship to the longitudinal axes of the side rails and the hinge means is turnable bodily with said side rails. Therefore, rotation of the connected side rails at both sides of the frame permits positioning of the hinge means thereof at a first unlocked position in which the hinge axes are disposed in parallel relationship to the common transverse plane of the longitudinal axes of the side rails at opposite side edges of the frame to permit said sections to be folded with respect to each other and a second locked position in which said hinge axes are disposed normal to said common plane to thereby lock said sections against relative folding movement. Each section of the frame will include load-engaging or supporting means which may be or include the tie members.

In the accompanying drawings, there is illustrated a preferred form of hand truck embodying this invention.

In these drawings:

FIGURE 1 is a perspective view of the hand truck in folded condition.

FIGURE 2 is a front elevational view of the truck in extended unlocked condition.

FIGURE 3 is a side elevational view of the truck in extended unlocked condition.

FIGURE 4 is a front elevational view of a truck in extended and locked condition.

FIGURE 5 is a view taken at the position indicated by line 5—5 of FIGURE 4, showing locking means associated with the truck handle.

FIGURE 6 is an enlarged sectional view taken through the locking means along line 6—6 of FIGURE 5.

FIGURE 7 is an enlarged sectional view taken along line 7—7 of FIGURE 2 through a connection between adjacent side rails.

With reference to the drawings, the hand truck embodying this invention is shown as comprising a base section 11, intermediate sections 12 and 13, and an upper handle section 14. However, it is to be understood that the intermediate sections may be varied in number as desired. The adjoining sections of the truck are connected together by sets of hinges 15, with the sets of hinges for connecting successive sections located on opposite faces of the truck frame so that the sections can be folded together in accordion style, as shown in FIGURE 1, wherein the sections are in upright, substantially parallel relationship. When the truck frame is unfolded or extended, the sections will be in longitudinally-adjoining relationship and have their side rails in a common plane, as shown in FIGURES 2, 3 and 4.

All of the sections are practically identical but the lowermost or base section 11 and the uppermost or handle section 14 differ from each other and from the intermediate sections in that they are provided with additional structure so that they can serve respectively as the base section and the handle section.

The intermediate sections 12 and 13 are identical so a detailed description of one will suffice. Each of these sections (FIGURES 1–4) comprises a pair of opposed, longitudinally-extending side rails 16 and a transversely-extending tie member 17. In the example shown, each side rail 16 of each section is composed of three separate but rigidly-connected, rectangular segments 16a, 16b and 16c with a single tie member 17 being provided and connected to the opposed segments 16b. However, the number of transversely-extending tie members 17 in each section can be varied and the number of segments in each cooperating rail can be correspondingly varied. It will be noted that on opposite sides of the tie 17 extensions 18 are provided in the form of pin portions which extend into the connector segments 16b. However, as indicated, each side of the tie may have a different number of pin portions depending upon the number of rail segments 16b at each side. The tie member 17 is shown in the form of a load-supporting frame but it can vary in character, for example, it may be in the form of a solid web member. It is merely necessary that it be connected to the side rails 16 so that they may be rotated relative thereto. To permit this relative rotation, the connector segment 16b of each side rail is rotatably mounted on a connector dowel pin or rod 19 of circular cross section (FIGURES 2 and 7). This dowel pin extends rotatably through the connector rail segment 16b and projects in opposite directions into sockets 20 formed in the adjacent ends of the opposed rail segments 16a and 16c. The ends of the dowel pin 19 are non-rotatably secured within the sockets 20 of the respective rail segments by means of transverse rivets or pins 21 which extend through the dowel pin and through the adjoining rail segments. Instead of the rail segments 16a and 16c and the dowel pin 19 being of separate but connected members, they may be formed as an integral unit.

The hinges 15 are shown in the form of strap hinges but they may be of other forms. The straps 25 of the hinges at each side of the frame are connected to one face or surface of the respective side rails so as to locate the lineal hinge pin or pintle 26 of each hinge transversely of the longitudinal axes of the associated rail segments and at right angles thereto. It will be noted that successive hinges along each side rail of the frame are at opposite surfaces or faces of the respective side rail. When the rails are turned about their longitudinal axes, the lineal hinge axes or pintles will turn from an unlocked position parallel with the common plane of the rails at opposite sides of the frame, or parallel to the plane of the tie members 17, to a locked position where the hinge axes are perpendicular to both of those planes.

As previously indicated, the lower or base frame section 11 is of special form and the rails at each side of the truck frame are mounted thereon for relative rotation about their longitudinal axes. Thus, the section 11 includes an upstanding, transversely-extending plate 27 and a forwardly-projecting shelf 28. At the outer ends of the plate 27, upright rail portions 16d are formed which are similar to the other rail segments 16a and 16c. The section 11 also includes upper rail segments 16e which are connected to the portions 16d by dowel pins 19 passing through connector members 16b identical with those previously described. A tie member 17a similar to the member 17 but approximately one-half the size is rigidly connected to the connector members 16b in a similar manner. The segments 16e of the lower section 11 are connected to the adjacent lower segments 16c of the section 12 by hinges 15 in the same manner that the other sections are hinged. Thus, the connected rail segments at each side of the truck frame may be rotated in unison about their longitudinal axes on the lower section 11.

The lower section 11 may be provided with rearwardly-extending supports 29 which carry a pair of wheels 30. However, it is to be understood that the lower section 11 may be varied in form as long as the side rails are mounted for rotation thereon about their longitudinal axes.

The uppermost section 14 is provided with rail segments 16f which are similar to the segments 16a and 16c. These segments are connected to the uppermost segments 16a of the section 16 by the hinges 15 in the same manner as the other hinge connections. The sections 16f are connected by the dowel pins 19 extending through the connectors 16b to respective handle portions 31 and 32. A transverse tie member 17b similar to the member 17a is rigidly connected to the connectors 16b of the upper section. The handle portions 31 and 32 have laterally-extending hand grips 31a and 32a which substantially meet when they are swung inwardly into alignment transversely of the truck frame (FIGURE 4). A latching means is provided for locking the hand grips 31a and 32a in alignment. This latching means comprises a sleeve 33 which is slidably mounted on the hand grip 31a and is limited in its sliding movement by a pin and slot connection 34. A compression spring 35 normally urges the sleeve 33 outwardly. As the grips 31a and 32a are swung into alignment, the sleeve 33 is retracted and when they reach aligning position, the sleeve is released so that it will be projected by the spring 35 over the grip 32a. Thus, the side rails at the sides of the truck frame may be rotated between unlocked and locked position by means of the hand grip portions 31a and 32a. In unlocked position (FIGURES 2 and 3), the hand grips will project rearwardly and can be gripped to aid in folding the truck. In locked position, the hand grips will be locked in alignment (FIGURE 4) and further rotation of the side rails will be precluded.

In folded condition, the truck will appear as in FIGURE 1 and the load-supporting shelf portion 28 will rest on the floor or other surface and support the entire truck, the wheels 30 being out of contact with that surface at this time. The frame sections 12 and 13 will be disposed upright between the upright sections 11 and 14 in substantially parallel relationship thereto, with the lower ends of the side rails 16 of the sections 12 and 13 resting on the upper surface of the shelf 28. The uppermost frame section 14 will, at this time, be forwardmost and the handle bar portions 31 and 32 will rest on the shelf portion 28. Thus, the truck unit will be a compact folded unit occupying a minimum space.

To unfold the truck unit, it is merely necessary to grab the handle portions 31a and 32a and extend the sections upwardly into adjoining aligning relationship, as indicated in FIGURES 2 and 3, where the side rails have their longitudinal axes in a common transverse plane with the hinge pins or axes of opposed side rails being opposite each other in axial alignment and parallel to said common transverse plane, as well as parallel to the plane of the members 17, 17a and 17b. However, successive transverse hinge axes will be at opposite sides of said common plane. At this time, the handle portions 31a and 32a will extend rearwardly and the frame will be unlocked. To lock the frame, to prevent folding, the hand grips 31a and 32a may be used to rotate the side rails about their longitudinal axes on the lower section 11 and relative to the tie members. This will bring the hand grips 31a and 32a in transverse axial alignment where they may be locked by the sleeve 33. At this time, the hinge axes on opposed side rails will be normal to the common plane of the longitudinal axes of the side rails as well as to the plane of the transverse tie members 17, 17a and 17b. In this locked condition, the truck may be handled by means of the transverse handle provided by the locked hand grips 31a and 32a.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A foldable vehicle comprising a wheel-mounted base section; a handle section; a plurality of intermediate, substantially rigid, relatively adjoining frame-forming sections foldably connected between said base and handle sections, each of said sections including a pair of relatively spaced apart, longitudinally extending side rails and at least one rigid cross tie extending transversely between said side rails; means rotatively connecting the side rails of each of said sections to the cross ties thereof and providing for axial turning movement only of said side rails with respect to said cross ties; and hinge means connecting the side rails of each of said sections to the side rails of another of said sections, said hinge means including lineal hinge axes disposed in perpendicular relation to the longitudinal axes of said side rails and said hinge means being turnable bodily with said side rails between a first position in which their hinge axes are disposed in parallel relation to the longitudinal axes of said cross ties to permit said sections to be folded with respect to one another and a second position in which their hinge axes are disposed in perpendicular relation to the longitudinal axes of said cross ties to thereby lock said sections against relative folding movement.

2. A foldable vehicle as defined in claim 1, wherein said hinge means comprise longitudinally spaced sets of hinges connected between the side rails of adjoining sections and wherein said sets of hinges are arranged alternately on opposite sides of the side rails of successive sections.

3. A foldable vehicle as defined in claim 1, wherein said handle section includes a pair of hand grips rigidly connected respectively with the side rails of said handle section and extending generally perpendicularly outwardly therefrom, said hand grips being manually rotatable to turn the side rails of said section and said hinge means in unison.

4. In a hand truck; a foldable frame comprising a pair of relatively spaced apart, longitudinally extending side rails each composed of a plurality of separate, relatively adjoining, straight sections; hinge means connecting the sections of said side rails to one another for movement between relatively folded and longitudinally extended positions, said hinge means having lineal hinge axes disposed in perpendicular relation to the longitudinal axes of said sections; a plurality of straight, rigid cross members extending transversely between and joining said side rails at longitudinally spaced intervals therealong, said cross members including opposite end portions rotatively, but non-slidably connected with said side rails and providing for axial turning movement of each of said side rails as a unit when the sections of said side rails occupy their relatively extended positions, and said hinge means being turnable with said side rails to positions in which their hinge axes are disposed in perpendicular relation to both the longitudinal axes of said side rails and the longitudinal axes of said cross members to thereby lock the adjoining side rail sections against relative folding movement; and handle means rigidly connected with each of said side rails for imparting axial turning movement thereto.

References Cited by the Examiner

UNITED STATES PATENTS 2,490,189  12/49  Alexander _____ 280—36

FOREIGN PATENTS 272,827  4/14  Germany.

ARTHUR L. LA POINT, *Primary Examiner.*